United States Patent [19]
Singleterry et al.

[11] Patent Number: 5,842,600
[45] Date of Patent: Dec. 1, 1998

[54] TANKLESS BEVERAGE WATER CARBONATION PROCESS AND APPARATUS

[75] Inventors: Ronald Clinton Singleterry, Bell Buckle; William M. Larson, Murfreesboro, both of Tenn.

[73] Assignee: Standex International Corporation, Murfreesboro, Tenn.

[21] Appl. No.: 680,246

[22] Filed: Jul. 11, 1996

[51] Int. Cl.$^6$ .................................................. G01F 11/00
[52] U.S. Cl. .................... 222/1; 222/129.1; 222/145.6; 222/459; 261/DIG. 7; 261/DIG. 75
[58] Field of Search ................... 222/1, 129.1, 145.5, 222/145.6, 459; 261/DIG. 7, DIG. 75

[56] References Cited

U.S. PATENT DOCUMENTS

| | | |
|---|---|---|
| 3,226,099 | 12/1965 | Black et al. . |
| 3,397,870 | 8/1968 | McCann et al. . |
| 3,572,550 | 3/1971 | Colomina et al. . |
| 3,752,452 | 8/1973 | Iannelli . |
| 3,761,066 | 9/1973 | Wheeler ............................ 261/DIG. 7 |
| 3,960,066 | 6/1976 | Knorr . |
| 4,093,188 | 6/1978 | Horner .................................... 366/336 |
| 4,093,681 | 6/1978 | Castillo et al. . |
| 4,222,972 | 9/1980 | Caldwell . |
| 4,271,097 | 6/1981 | Garrard . |
| 4,308,138 | 12/1981 | Woltman .......................... 261/DIG. 75 |
| 4,313,897 | 2/1982 | Garrard . |
| 4,370,304 | 1/1983 | Hendriks et al. ................. 261/DIG. 75 |
| 4,382,044 | 5/1983 | Baumgartner et al. .......... 261/DIG. 75 |
| 4,520,950 | 6/1985 | Jeans . |
| 4,526,730 | 7/1985 | Cochran et al. . |
| 4,555,371 | 11/1985 | Jeans et al. . |
| 4,629,589 | 12/1986 | Burke et al. . |
| 4,636,337 | 1/1987 | Camp et al. . |
| 4,695,378 | 9/1987 | Ackman et al. .................. 261/DIG. 75 |
| 4,708,827 | 11/1987 | McMillin . |
| 4,749,580 | 6/1988 | Demyanovich . |
| 4,764,315 | 8/1988 | Brusa . |
| 4,804,112 | 2/1989 | Jeans ..................................... 222/129.1 |
| 4,840,493 | 6/1989 | Horner .................................... 366/339 |
| 4,850,705 | 7/1989 | Horner .................................... 366/339 |
| 4,859,376 | 8/1989 | Hancock et al. . |
| 4,927,567 | 5/1990 | Rudick . |
| 4,999,140 | 3/1991 | Sutherland et al. . |
| 5,152,935 | 10/1992 | Robertson . |
| 5,350,082 | 9/1994 | Cox et al. . |
| 5,383,581 | 1/1995 | LeMarbe et al. .................... 222/129.1 |

*Primary Examiner*—Joseph Kaufman
*Attorney, Agent, or Firm*—Luedeka, Neely & Graham PC

[57] ABSTRACT

Carbonated beverage water is prepared on flow demand by a process that combines respective flow streams of water and carbon dioxide in a mixing venturi. Downstream of the venturi, the mixture of water and carbon dioxide is passed through a static mixer prior to dispenser discharge.

19 Claims, 3 Drawing Sheets

TANKLESS BEVERAGE WATER CARBONATION PROCESS AND APPARATUS

BACKGROUND OF THE INVENTION

The present invention is directed to the art of carbonated beverage production and more particularly, to the art of dissolving gaseous carbon dioxide into water before combination with a coloring or flavoring agent.

Carbonated soft drinks usually comprise a sweetening agent, acid, flavor, color and a preservative. These ingredients must be combined in the proper ratio in order to make an appealing and refreshing carbonated beverage. However, the constituent of greatest quantity is a solution of carbonated water which represents 80% to 85% of the beverage.

The combination of carbon dioxide to the mixture is synergistic, by contributing the characteristic pungent taste or bite associated with carbonated beverages. In addition, however, carbon dioxide inhibits the growth of mold and bacteria. Depending on the extent of carbonation, carbon dioxide may even destroy bacteria.

While the relative quantity of carbon dioxide dissolved in the beverage water constituent is distinctive to each beverage and the impact desired, usually the two ingredients are combined in a ratio of 6 to 7 standard cubic feet (SCF) of gaseous carbon dioxide per cubic foot of water. This combination is usually produced by a batch process using a mixing tank (carbonator tank) which is supplied with gaseous carbon dioxide and water. Mixing occurs when pressurized water is pumped into the carbonator tank through an orifice and combined with the carbon dioxide gas in the tank. U.S. Pat. No. 3,397,870 to G. P. McCann et al is representative.

It is an object of the present invention, therefore, to provide a tankless carbonation system.

Another object of the present invention is a water and carbon dioxide mixing system that dissolves the gas with the water flow in transit to a dispenser.

A still further object of the present invention is to generate carbonated water on immediate flow demand.

SUMMARY OF THE INVENTION

These and other objects of the invention as will become apparent from the detailed description of the invention to follow, are provided by a pumped water supply to a mixing venturi at about 200 to 300 psi for good carbonation. Pressure downstream of the venturi throat is about 100 psi to provide a proper ratio of inlet to discharge pressure.

A carbon dioxide gas conduit enters the venturi downstream of the throat at about 100 psi to 120 psi, also for good carbonation. The carbon dioxide flow rate into the venturi is regulated in coordination with the water supply to provide the desired water-to-gas ratio. From the venturi, the mixture is preferably channeled through a fluid mixer before combination with flavored syrup by a proportional ratio valve for release from a dispenser.

BRIEF DESCRIPTION OF THE DRAWINGS

Relative to the drawings wherein like reference characters designate like or similar elements throughout the several figures of the drawings.

DESCRIPTION OF THE PREFERRED EMBODIMENTS

Figure 1:
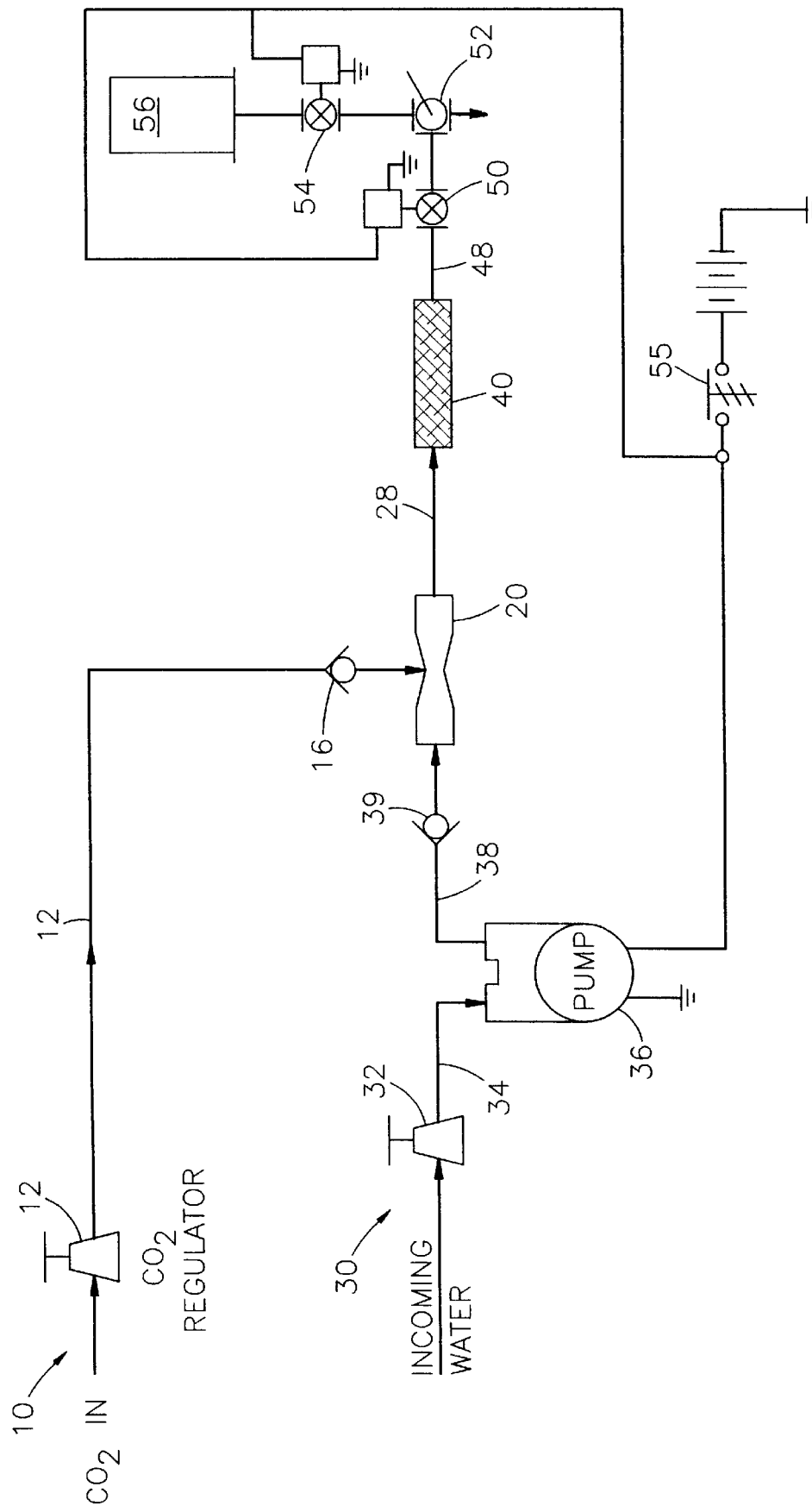
FIG. 1 illustrates a piping schematic for a basic embodiment of the invention.

Referring to FIG. 1, a gaseous carbon dioxide supply 10 is pressure reduced by a pressure regulator 12 to about 120 psi into a venturi induction line 14. A check valve 16 protects the pressure regulator 12 by rectifying the gas flow direction within the induction line.

In the context of the present invention, the term venturi is used in its broadest sense as a mechanical device or area constriction in a fluid flow pipe to produce a low pressure zone in a flow stream. Such devices are also characterized as ejectors, eductors and jet pumps.

A potable water supply 30 is pressure reduced into a pump suction 34 by a water pressure regulator 32. Pump 36 is preferably of the sliding vane type driven by an electric motor. The pump delivery pressure to the venturi throughflow conduit 38 is about 280 psi with a delivery of about 84 gallons per hour for a one drink sequential capacity. A check valve 39 rectifies the flow delivery direction within conduit 38.

Figure 2:
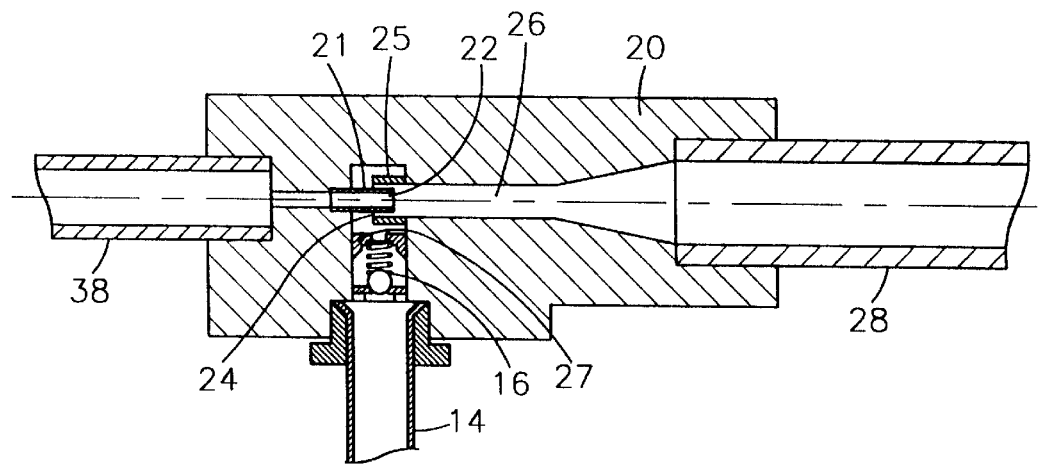
FIG. 2 is a cross sectional view of a mixing venturi suitable for use with the present invention.

The mixing venturi 20 shown in detail by the section of FIG. 2, includes a small orifice 22 from a water conduit projecting into the throat of a divergent discharge nozzle 26. A brass venturi of such description may be obtained from the Dema Co. of St. Louis, Mo. as Model No. 201C. A preferred embodiment of the invention would use a stainless steel or plastic venturi. The Fox Development Corp. of Dover, N.J. produces a stainless steel model 611210. Preferably, the venturi 20 has a built in check valve 16 to prevent back flow of water into the gas line 14. An annular opening 24 between conduit projection 21 outside diameter and the inside diameter of the nozzle throat 25 connects the gas plenum chamber 27 with the low pressure zone of the nozzle 26. The nozzle discharges into an intermediate delivery conduit 28. The carbon dioxide induction line 14 opens into the plenum chamber 27.

Figure 3:
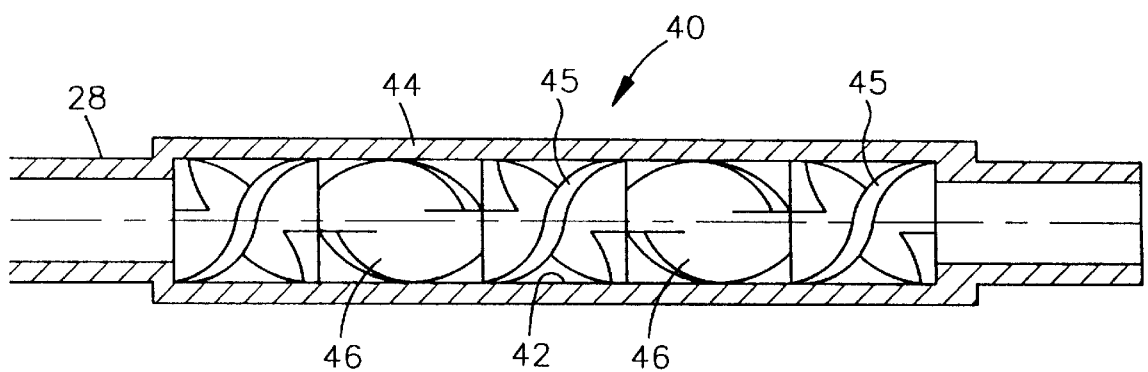
FIG. 3 illustrates a multiple mixing line embodiment of the invention.

A water-gas mixture from the nozzle 26 is delivered by conduit 28 to line mixer 40 of the general type represented by U.S. Pat. Nos. 4,093,188, 4,840,493 or 4,850,705 and illustrated by FIG. 3. This particular design of static line mixer is shown to include a chamber 42 within a pipe wall 44 having a multiplicity of mixing vanes 45 and 46 distributed along the central flow axis whereby fluid flow through the chamber induces a high degree of turbulence and radial flow as the water-gas mixture moves axially along the mixer length. Other mixer styles, either static or dynamic, that effectively entrain or dissolve the gas into the water may be used. The preferred embodiment of the invention incorporates a model ISG Motionless Mixer produced by Ross Engineering, Inc. of Savanna, Ga.

It should be noted that the presently described carbonation system has been operated to achieve a 69% mixing efficiency out of the mixing venturi 20 and a 95% overall mixing efficiency in the discharge line 48 from the line mixer 40. Comparatively, 95% mixing efficiency is about the best a state-of-the-art tank carbonator can achieve.

Returning to the operation of FIG. 1, discharge line 48 channels the 95% carbonated water through a solenoid flow valve 50 to a proportionalizing mixer 52 where the carbonated water is combined with flavored syrup.

A highly simplified electrical control schematic for the FIG. 1 embodiment includes a spring loaded switch 55 that is biased to the open position. When the switch 55 is closed, the circuit starts the pump 36 to initiate water flow through the venturi 20 and open the valve 50 to discharge carbonated water from the static mixer 40 at a single serving rate. Simultaneously, solenoid valve 54 is opened to admit a flow of beverage syrup from the reservoir 56. The proportionalizing mixer 52 such as a traditional "soda fountain" valve, dispenses the finished beverage at the relative flow rate of about 4 to 5 volumes of carbonated water to 1 volume of syrup. There are differences, however, in the present invention operation from that of traditional prior art. In a prior art carbonation tank system, valve 52 is served by pressurized carbonated water and syrup lines. Within the valve, separate passages respective to each of these lines contain an adjustable needle valve to regulate individual flow for control of the overall dispense rate and the 4 to 5:1 drink ratio. In theory, a change in the needle valve orifice area will cause a corresponding change in flow rate based on a constant upstream tank pressure.

In the present invention, carbonated water is supplied to the valve 52 at a constant flow rate by a positive displacement pump. The needle valve only controls the carbonated water line back pressure which is critical for efficient gas mixing and good carbonation numbers. The syrup needle valve controls the syrup flow and overall drink ratio.

Figure 4:
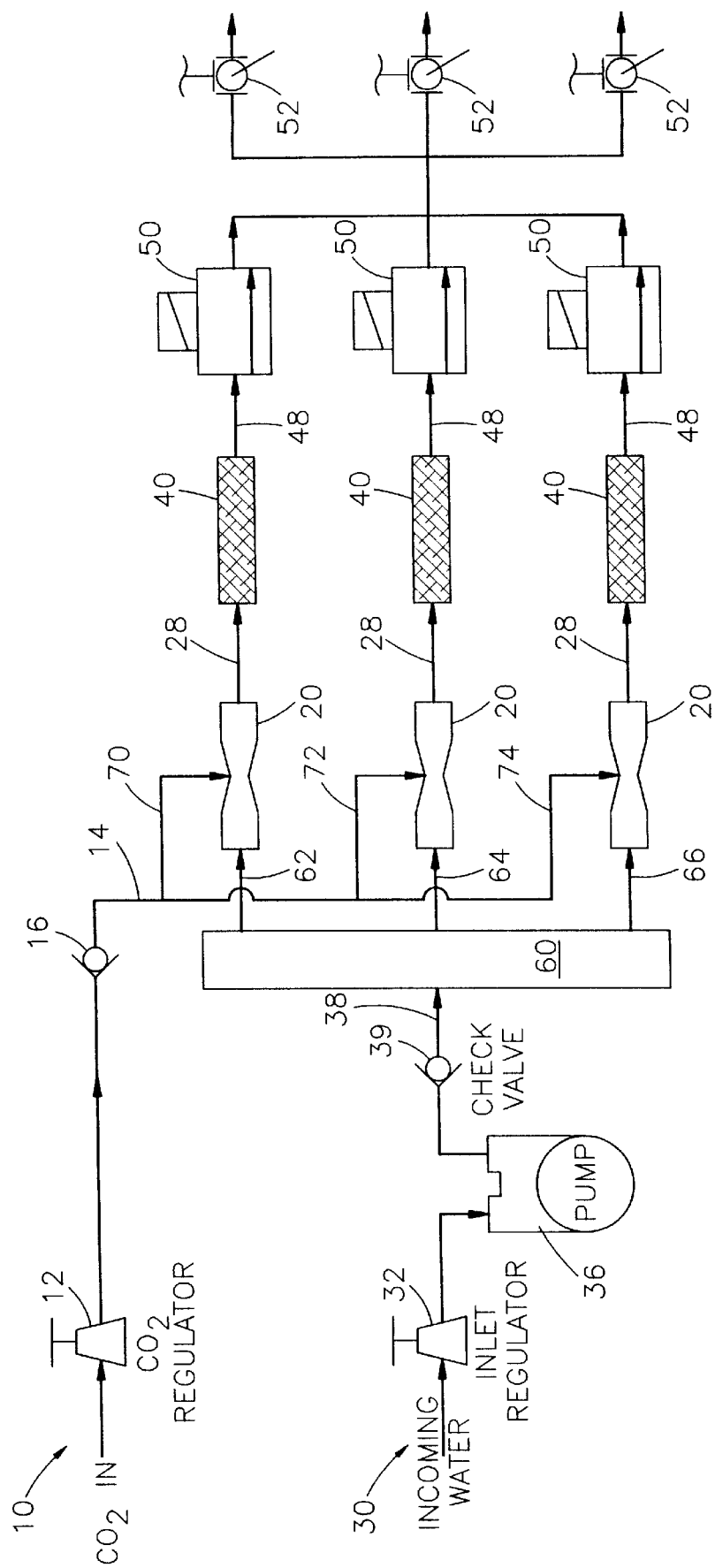
FIG. 4 illustrates a multiple venturi embodiment of the invention.

The system represented by the schematic of FIG. 4 is a variable flow dispensing system wherein the flow rate of carbonated water is altered immediately by the corresponding demand and in iterative increments. An operational example is an increase in the carbonated water demand rate as by a temporary need to increase the beverage production rate. As in any case, the pump 36 includes enough capacity to meet the maximum demand delivered from a manifold 60 into respective production lines 62, 64 and 66. Cooperatively, the carbon dioxide gas line 14 is provided with respective spurs 70, 72, and 74. However, venturi mixing efficiency is extremely flow critical. Consequently, each mixing venturi should be flow trimmed to the optimum, single flow rate efficiency. So long as the manifold 60 is held at the designated pressure by availability from the pump 36 and the trim pressure is held in the gas spurs 70, 72 and 74, each of these lines, when respective dispensing solenoids 50 are opened, will add a designated increment of carbonated water flow rate to the proportionalizing mixers 52. Each increment, however, will maintain the same high solution efficiency.

It will be understood to those of ordinary skill in the art that for beverage dispensing, other ingredients such as flavor and coloring may be introduced to the flow system at almost any point in the water carbonation flow stream. Usually, flavor and coloring, ie., syrup, is combined with the carbonated water prior to or at the dispenser as described by FIGS. 1 and 4. However, it is not unknown to dispense the syrup and carbonated water separately and sequentially for final mixing in the consumption vessel. However, this sequence is not a requirement although carbon dioxide solubility in pure water may be greater than in the syrup blended fluid.

Having fully disclosed my invention, those of ordinary skill in the art will recognize equivalencies and obvious alternatives. As my invention, however,

I claim:

1. A carbonated beverage blending process comprising the steps of:

discharging a pressurized flowstream of potable water from a motor driven pump;

directing the potable water flowstream from said pump through a flow restriction that operates to produce a reduced pressure zone in said flowstream, said flowstream having a first pressure upstream of said restriction and a second pressure downstream of said restriction, said first pressure being greater than said second pressure;

introducing a gaseous carbon dioxide flowstream into said water flowstream at or about said reduced pressure zone for mixture with said water flowstream, said carbon dioxide flowstream having a third pressure that is less than said first pressure and greater than said second pressure;

flowing a mixture of said water and carbon dioxide flowstreams into a static flow mixing tube to substantially dissolve said carbon dioxide in said water; and, combining a flow solution of said water and carbon dioxide flowstreams from said static flow mixing tube with a flowstream of beverage flavoring syrup.

2. A carbonated beverage blending process as described by claim 1 wherein said solution of water and carbon dioxide is proportionally blended with said beverage flavoring syrup.

3. A carbonated beverage blending process as described by claim 2 wherein said flow restriction comprises a venturi having a throat area, said reduced pressure zone being proximate of said throat area.

4. A carbonated beverage blending process as described by claim 3 wherein said carbon dioxide flowstream is mixed with said water flowstream to dissolve about 6 to 7 standard atmosphere unit volumes of carbon dioxide into about one liquid unit volume of water.

5. A carbonated beverage blending process as described by claim 4 wherein about 4 to 5 liquid unit volumes of the water and carbon dioxide solution are proportionally mixed with one volume of beverage flavoring syrup.

6. A beverage water carbonation process comprising the steps of:

directing a potable water flowstream from a pump discharge along a substantially axial flow passage through a venturi having a constricted area throat to generate a reduced pressure zone within said venturi, said water flowstream having a first pressure upstream of said throat and a second pressure downstream of said throat, said first pressure being greater than that of said second pressure;

introducing a gaseous carbon dioxide flowstream into said water flowstream within said venturi at or about said reduced pressure zone for mixture and substantially dissolved combination with said water flow stream, said carbon dioxide flow stream having a third pressure less than said first pressure and greater than said second pressure;

flowing the substantially dissolved combination of carbon dioxide and water through a static mixing device; and mixing a solution of water and carbon dioxide from said mixing device with beverage flavoring syrup.

7. A process as described by claim 6 wherein said first static pressure is about 280 psi, said second static pressure is about 100 psi and said third static pressure is about 120 psi.

8. A process as described by claim 6 wherein gas and water flow rates are coordinated to dissolve about 6 to 7 standard atmosphere unit volumes of carbon dioxide in about one liquid unit volume of water.

9. A process as described by claim 6 wherein said solution flows from said mixing device to a beverage syrup proportional blending device.

10. A process as described by claim 9 wherein said solution is combined with flavoring between said mixing device and a dispensing device.

11. A process as described by claim 9 wherein said solution flows from said mixing device to a plurality of dispensing devices.

12. A process as described by claim 6 wherein said water flow stream originates from a manifold.

13. A process as described by claim 12 wherein a plurality of water flow streams originate from said manifold.

14. A process as described by claim 13 wherein each of said water flow streams serves a respective venturi and mixing device.

15. A process as described by claim 14 wherein mixture from each of said mixing devices flows to a respective beverage dispensing device.

16. An apparatus for carbonating beverage water comprising:

- a venturi having a substantially axial water flow passage through a flow area constriction between an upstream end of said venturi and a downstream end thereof, said venturi also having a carbon dioxide flow passage entering said water flow passage on the downstream side of said flow area constriction;
- a water carrying conduit connected to the upstream end of said venturi and a carbon dioxide carrying conduit connected to said carbon dioxide flow passage;
- pump means having a suction connected to a potable water supply source and a discharge connected to said water carrying conduit, said pump means being operatively controlled by switch means,
- a first mixture conduit connecting said venturi downstream end with a fluid flow inlet to a static mixer,
- a second mixture conduit connecting a fluid flow exit from said static mixer with a proportionalizing mixer; and
- carbonated water valve means in said second mixture conduit operatively controlled by said switch means whereby said carbonated water valve means is opened substantially simultaneously with starting the operating of said pump means.

17. An apparatus as described by claim 16 further comprising a manifold for supplying water to a plurality of water carrying conduits and respective venturis.

18. An apparatus as described by claim 17 wherein each venturi is connected to a respective static mixer and each static mixer supplies a respective beverage dispensing device.

19. An apparatus as described by claim 16 wherein a beverage syrup supply means is connected to said proportionalizing mixer by a syrup conduit, syrup valve means in said syrup conduit operatively controlled by said switch means whereby said syrup valve means is opened substantially simultaneously with said carbonated water valve means.

* * * * *